UNITED STATES PATENT OFFICE.

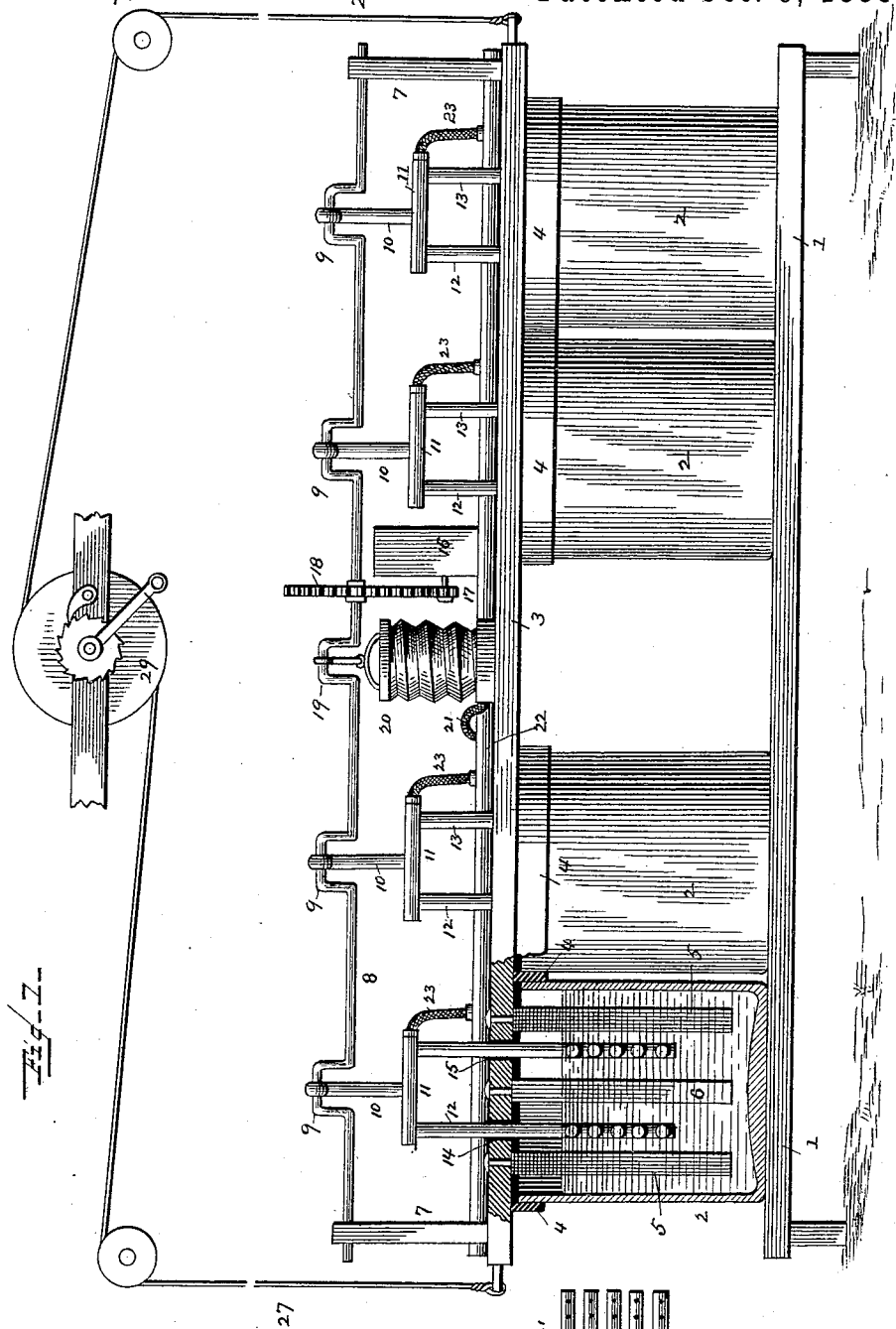

DAVID HUMPHREYS, OF CINCINNATI, OHIO.

GALVANIC BATTERY.

SPECIFICATION forming part of Letters Patent No. 390,677, dated October 9, 1888.

Application filed March 10, 1888. Serial No. 266,857. (No model.)

*To all whom it may concern:*

Be it known that I, DAVID HUMPHREYS, a citizen of the United States, residing at Cincinnati, in the county of Hamilton and State of Ohio, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to galvanic batteries of that type in which the exciting-liquid is agitated and aerated, and has for its object the production of an apparatus in which these objects will be more efficiently effected than heretofore, and in which accumulation of polarizing-gases on the negative electrode surface will be prevented.

In prior applications filed by me, Serial No. 266,307, filed March 6, 1888; Serial No. 266,524, filed March 8, 1888, and Serial No. 266,740, filed March 9, 1888, have been described various forms of apparatus for agitating the liquid and aerating the same and neutralizing the deleterious effects of the hydrogen liberated by electrolytic action. In those cases the air was trapped by a reciprocating or rotary device and carried into the liquid and liberated under its surface.

My present invention provides for the distribution of air over the entire negative surface and embodies apparatus for effecting these results. It also embodies apparatus for producing an agitation of the liquid by a mechanical agitator and conjoint aeration of the excitant. Moreover, it contemplates the use of such apparatus with a simple battery-solution, or with solutions which contain depolarizing materials. It embodies, also, details of structure, which will hereinafter be fully described in this specification, and then definitely indicated in the appended claims.

In the accompanying drawings, which illustrate my invention, Figure 1 is a side elevation, partly in section, of an apparatus embodying my invention. Fig. 2 is a detail, partly in section, showing one of the aerating and agitating devices.

1 represents a stand, on which are supported a series of cells, 2 2 2 2. These cells are provided with a cover, 3, common to all of them, said cover being provided with a box-shaped flange, 4, having suitable partitions and gaskets to make a practically fluid-tight joint when the cover is down upon the edges of the cells. Upon the under side of the cover are mounted the positive and negative electrodes 6 5 5 of the battery, a set of these electrodes corresponding to each cell.

The positive or soluble electrode 6 is preferably of zinc, and the negative or conducting electrodes 5 5 of carbon. Two of the latter are provided, so as to face both sides of the zinc. On the ends of the cover are fixed supports 7 7, in which is trunnioned a crank-shaft, 8, provided with a series of bends or cranks, 9 9 9 9. Upon these cranks are hung rods 10 10 10 10, one for each cell of battery. Each rod has a tubular cross-piece, 11, closed at one end and open at the other, and secured to each cross-piece and in open relation with its tubular space are vertical tubes 12 13. These tubes should be made of some material calculated to withstand the action of battery-solutions. Hard rubber answers well, as in addition to its acid-resisting properties it is light and strong. These vertical tubes extend through slots 14 15 in the cover 3, and are provided with a series of tubular cross-arms, 24 24', perforated, as shown in Fig. 2, and closed at their outer ends, but communicating with the main tube at their inner ends.

A motor, 16, which may be controlled by a spring or any other suitable motive agent, acts through a pinion, 17, upon a gear-wheel, 18, firmly secured to the crank-shaft. The gear-wheels should be so proportioned as to size and number of teeth that a slow rotary movement will be communicated to the shaft 8. Upon a crank, 19, of the shaft is hung a link connecting with a blower or bellows fixed to the cover 20, and the bellows communicates by a tube, 21, with a pipe, 22. Flexible tubular connections 23 23 23 23 establish air communication at all times between the pipe 22 and the tubular cross-pieces 11.

The cranks 9 are made of such a length that the series of perforated tubes 24 24' will be vertically reciprocated, so as to cover the whole surface of the electrodes, and the tubes 24 24' are long enough to cover the width of said electrodes. These latter tubes are preferably perforated on both sides facing the zinc and carbon electrodes.

My apparatus will yield good results with any solution whether it contains a chemical depolarizing material or not; but I prefer to use in practice a solution of bichromate of potash or soda and water acidulated with sulphuric acid. This solution yields a high electro-motive force and has a very low resistance; but the difficulty has been with bichromate solutions that they decline rapidly in depolarizing-power when doing work, as when the battery is placed on closed circuit. This difficulty is due to an exhaustion of oxygen from the film of solution in immediate contact with the negative electrode. In the use of these solutions matter accumulates on the positive electrode or zinc, increasing the resistance and obstructing the access of the acid to the zinc. My apparatus obviates to a considerable degree these difficulties.

The operation of my apparatus is as follows: The motor 16 is set in operation. As the crank-shaft reciprocates, the arms 24 24' are reciprocated vertically and laterally in the excitant. The blower or bellows forces fresh air through the perforations of the arms at each revolution of the crank shaft, and this air escapes through the excitant, revivifying it, and keeps the positive and negative electrodes clean. The aerating process agitates the excitant and causes the same to be uniformly reduced during the action of the battery—that is to say, when the oxygen of the film in contact with the negative electrode is exhausted a fresh film will be caused to take its place, and when the acid of the film in contact with the positive electrode is formed into a salt of zinc fresh acid is supplied.

The aerating-tubes are placed in practice close to the negative surface. Air is discharged, therefore, directly against said surface, and will reduce or coalesce with any hydrogen bubbles which may accumulate there by reason of failure of the solution to reduce the same. It will be observed, therefore, that in my battery a very high efficiency is secured, first, by the mechanical agitation of the solution and dislodgment of hydrogen from the negative electrode and sediment from the positive electrode; second, by a reduction of the hydrogen by bringing air in contact with it; third, by preserving uniformity in the solution, so that the whole body of the solution is made to contribute its full power to the battery; fourth, by the aeration of the liquid and its revivification thereby; fifth, by the aeration and agitation of the depolarizing liquid.

Having thus described my invention, what I claim as new, and desire to secure by Letters Patent, is—

1. In a galvanic battery, the combination, with the positive and negative electrodes, of an aerating device provided with openings opposite the negative surface and a blower for forcing air through said opening.

2. In a galvanic battery, the combination, with the positive and negative electrodes, of an aerating device provided with openings opposite the negative surface, a blower for forcing air through said openings, and means for shifting said openings over the carbon surface, whereby the air may be discharged successively against different parts of said surface.

3. In a galvanic battery, the combination, with the positive and negative electrodes, of an aerating device close to the negative surface, a blower for forcing air upon said negative surface, and a motor for reciprocating said device so as to discharge the air against the entire negative surface.

4. In a galvanic battery, the combination, with the positive and negative electrodes, of an aerating device provided with openings opposite said electrodes, a blower for forcing air through the openings, and means for reciprocating the aerating device so as to discharge the air toward the electrodes at different vertical elevations.

5. In a galvanic battery, the combination, with the positive and negative electrodes and an exciting and depolarizing solution, of an aerating device, a mechanical agitator in said solution, and a motor for operating said agitator.

6. In a galvanic battery, the combination, with the positive and negative electrodes and an exciting and depolarizing solution, of a mechanical agitator, a blower for forcing a gas into the solution, and a motor for operating both the agitator and the blower.

In testimony whereof I affix my signature in presence of two witnesses.

DAVID HUMPHREYS.

Witnesses:
ROBT. H. READ,
M. P. CALLAN.